United States Patent
Lin et al.

(10) Patent No.: US 8,848,115 B2
(45) Date of Patent: Sep. 30, 2014

(54) SIGNAL CONTROLLING METHOD FOR 3D IMAGE DISPLAY DEVICE

(75) Inventors: Shih-Chieh Lin, Sanchong (TW);
Hsiang-Tan Lin, Keelung (TW);
Chien-Hung Chen, Tucheng (TW);
Chun-Chieh Chiu, Taoyuan County (TW)

(73) Assignee: Chunghwa Picture Tubes, Ltd., Bade, Taoyuan County (TW)

( * ) Notice: Subject to any disclaimer, the term of this patent is extended or adjusted under 35 U.S.C. 154(b) by 977 days.

(21) Appl. No.: 12/954,869

(22) Filed: Nov. 27, 2010

(65) Prior Publication Data

US 2012/0105511 A1   May 3, 2012

Related U.S. Application Data

(63) Continuation of application No. 12/938,389, filed on Nov. 3, 2010, now abandoned.

(51) Int. Cl.
| | |
|---|---|
| *G02F 1/1335* | (2006.01) |
| *H04N 13/02* | (2006.01) |
| *G02B 27/26* | (2006.01) |
| *H04N 13/04* | (2006.01) |

(52) U.S. Cl.
CPC ............ *G02B 27/26* (2013.01); *H04N 13/0434* (2013.01)
USPC .............................................. 349/15; 348/51

(58) Field of Classification Search
CPC ............ G02F 2203/30; G09G 3/3233; G09G 3/3648; G02B 27/2207; G02B 27/2214
USPC .......... 349/15, 85; 345/84, 87, 89; 348/42–60
See application file for complete search history.

(56) References Cited

U.S. PATENT DOCUMENTS

| | | | | |
|---|---|---|---|---|
| 7,705,935 | B2 * | 4/2010 | Gaudreau ........................ | 349/96 |
| 8,619,206 | B2 * | 12/2013 | Nam et al. ...................... | 349/33 |
| 2010/0289883 | A1 * | 11/2010 | Goris et al. ..................... | 348/56 |
| 2013/0207955 | A1 * | 8/2013 | Kim et al. ...................... | 345/212 |

FOREIGN PATENT DOCUMENTS

CN         101782687 A         7/2010

* cited by examiner

*Primary Examiner* — Dung Nguyen
(74) *Attorney, Agent, or Firm* — Chih Feng Yeh; Huntington IP Counsulting Co., Ltd.

(57) ABSTRACT

The present invention provides a 3D image signal controlling method. The method comprises inputting a left eye image into the first liquid crystal layer, turning off the backlight module and switching gray levels of the second liquid crystal layer to a minimum gray level during (4N−3)th time interval, wherein N is natural number; stopping inputting the left eye image, turning on the backlight module and remaining the gray levels of the second liquid crystal layer as the minimum gray level during (4N−2)th time interval; inputting a right eye image into the first liquid crystal layer, turning off the backlight module and switching the gray levels of the second liquid crystal layer as a maximum gray level during (4N−1)th time interval; and stopping inputting the right eye image, turning on the backlight module and remaining the gray levels of the second liquid crystal layer as the maximum gray level during (4N)th time interval.

3 Claims, 5 Drawing Sheets

SIGNAL CONTROLLING METHOD FOR 3D IMAGE DISPLAY DEVICE

CROSS-REFERENCE

The present application is a continuation application of a U.S. patent application Ser. No. 12/938,389, entitled "3D Image Display Device", and filed on Nov. 3, 2010, which is incorporated herein by reference in its entirety.

TECHNICAL FIELD

The present invention relates to three dimensional stereoscopic images, and more particularly to a signal controlling method for a 3D image display device.

BACKGROUND OF THE RELATED ART

Three dimensional stereoscopic image display technology has become the current trend in the image display technology field. The imaging theorem for the three dimensional stereoscopic image involves that seeing a target object by a left eye and a right eye to get the different images, thereby forming depth perceptions with farness and nearness. Multiple devices can be utilized to render the left eye and the right eye to see images with different views. Three dimensional image display devices can be classified as a glasses type and a bare-eye type. In the glasses type 3D image display devices, the most common ones involve the usage of shutter glasses, polarization glasses, anaglyph glasses, and pulfrich glasses. In the bare-eye type 3D image display devices, the most common ones are an eHolographic type, a volumetric type and a multiplexed 2-D type. The multiplexed 2-D type can be further classified as a spatial-multiplexed type, a time-multiplexed type and a tracking-based type.

Recently, the relatively mature and common stereoscopic display technique in the market is the glasses type stereoscopic display technique, and the shutter glasses is the relatively common glasses type stereoscopic display device in the market, where Nvidia is the most representative one. No matter what kinds of devices are used, the methods for generating different information for the left eye and the right eye are similar. Generally, different images are provided to the left eye and the right eye respectively to generate stereoscopic perceptions. The basic principle for generating stereoscopic image is based on that a left eye and a right eye separately see the object from different angles, i.e. the images observed from the left eye and the right eye are not completely the same. In the 3D glasses display system, 2D images of two different angles of view (L, R) are received by the left eyeglass and the right eyeglass at different times. When the left eye information is shown in the display, the right eyeglass is sheltered and the left eyeglass is transparent, and vice versa. Therefore, the left eye can see the left eye image only and the right eye can see the right eye image only.

Currently, the 3D glasses are classified as active type 3D glasses and passive type 3D glasses. The active type 3D glasses are the relatively common 3D glasses in the market, but it suffers some problems. For example, the active type 3D glasses need batteries and therefore it induces the charging problem and it does not satisfy the environmental protection concept. Furthermore, the effective distance between the active type 3D glasses and the emitter is limited and the signal emitted from the emitter may be shielded by any objects between the active type 3D glasses and the emitter. Moreover, the active type 3D glasses are expensive. On the contrary, the structure of the passive type 3D glasses is simple and can solve the problems of the active type 3D glasses. Currently, the passive type 3D glasses are utilized in the micro-retarder system to apply in 3D visualization. For example, in the micro-retarder system, the first line is employed for the right eye image and the second line is used to provide the left eye image. The left eye image information and the right eye image information are provided in order from the top to the bottom of the display, and the vertical resolution of the display will be downgraded because the pixels of the display are separated to show the left eye image and the right eye image at the same time.

The upper polaroid of the current 3D glasses, for example the shutter glasses, is characterized by a linear polaroid. When the absorption axis of the linear polaroid of the 3D glasses is parallel to the one of the upper linear polaroid of the display, the polarized light is filtered out by the 3D glasses. Therefore, when the user wears the 3D glasses in an unacceptable angle or observes an object through the 3D glasses in an unacceptable angle of view, it will cause that the image is blocked and influences the 3D observation.

Accordingly, we still need a solution which can solve the aforementioned problems of the conventional passive type 3D glasses, for example the limited wearing angle and the insufficient vertical resolution.

SUMMARY

To solve the aforementioned problems of the conventional passive type 3D glasses, for example the limited wearing angle and the insufficient vertical resolution, the present invention provides a signal controlling method for a 3D image display device.

In one aspect, the present invention provides a 3D image signal controlling method to control the 3D image display device. The method comprises inputting a left eye image into the first liquid crystal layer, turning off the backlight module and switching gray levels of the second liquid crystal layer to a minimum gray level during (4N−3)th time interval, wherein N is natural number; stopping inputting the left eye image, turning on the backlight module and remaining the gray levels of the second liquid crystal layer as the minimum gray level during (4N−2)th time interval; inputting a right eye image into the first liquid crystal layer, turning off the backlight module and switching the gray levels of the second liquid crystal layer as a maximum gray level during (4N−1)th time interval; and stopping inputting the right eye image, turning on the backlight module and remaining the gray levels of the second liquid crystal layer as the maximum gray level during (4N)th time interval.

One advantage of the present invention is that the 3D image signal controlling method can render the user to see 3D stereoscopic images no matter the user wears the circularly polarized glasses at any angles.

Another advantage of the present invention is that the left eye image with the left-circularly polarized light or the right eye image with the right-circularly polarized light generated by the present invention will have complete image resolution in the horizontal or vertical direction and will not suffer the problem of the insufficient vertical resolution.

Furthermore, another advantage of the present invention is that the circularly polarized glasses in cooperation with the 3D image display device do not require batteries and emitter, such that the issues of the limited effective distance between the 3D glasses and the emitter and shielding by other objects and the charging problems or the environment pollution problems will be eliminated.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are provided only for illustrating but not for limiting the scope of the claims and wherein:

DETAILED DESCRIPTION

The invention will now be described with the preferred embodiments and aspects and these descriptions interpret structure and procedures of the invention only for illustrating but not for limiting the claims of the invention. Therefore, except the preferred embodiments in the specification, the present invention may also be widely used in other embodiments.

Figure 1:
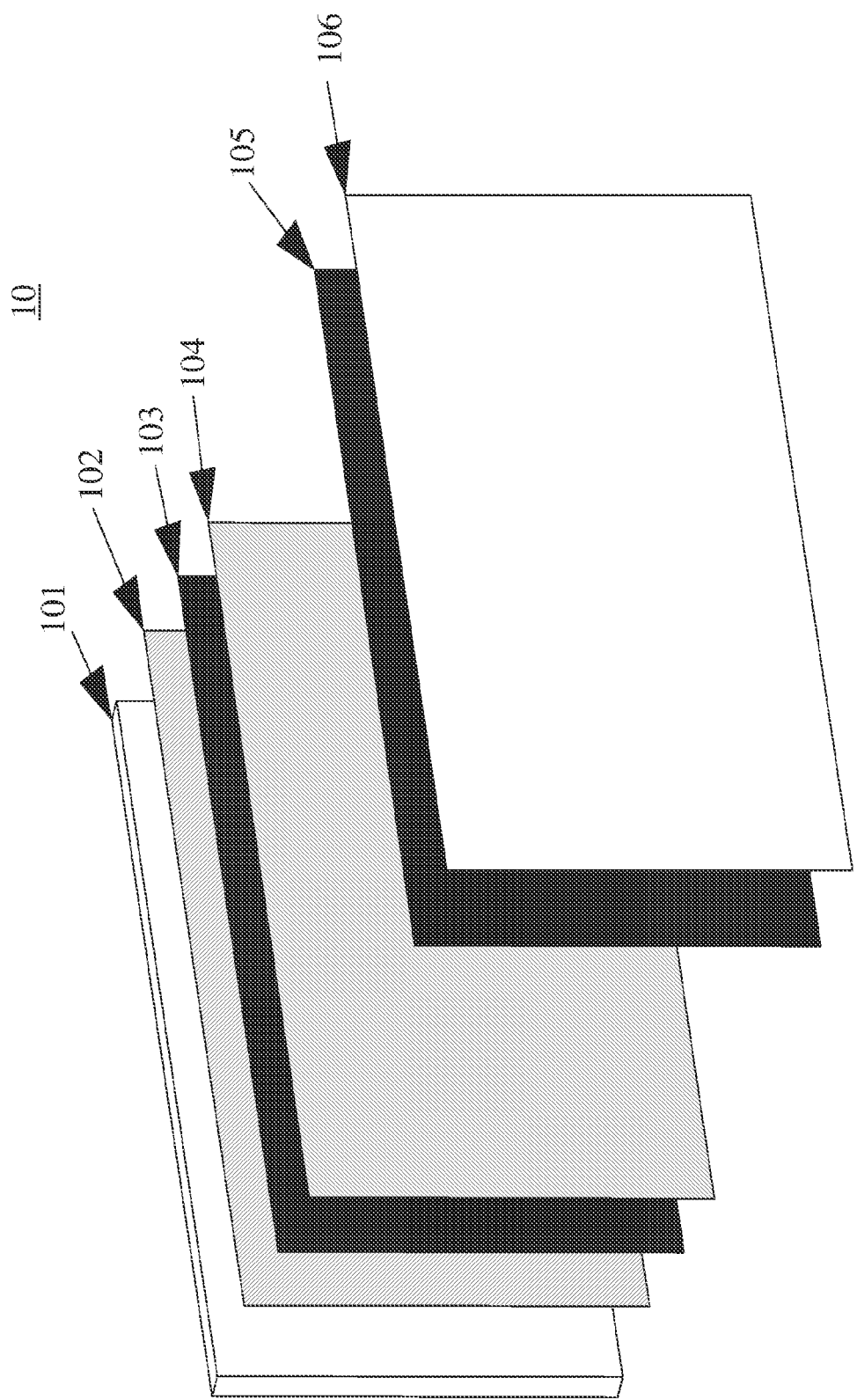
FIG. 1 illustrates a structure diagram of a 3D image display device in accordance with one embodiment of the present invention.

The present invention provides a 3D image display device. As shown in FIG. 1, the 3D image display device 10 of the present invention includes a backlight module 101 to provide the back light, and a first linear polaroid 102 disposed in front of the backlight module 101 to polarize the light from the backlight module 101. A first liquid crystal layer 103 is disposed in front of the first linear polaroid 102 to display image signals. A second linear polaroid 104, a second liquid crystal layer 105 and a retarding layer 106 are disposed in order in front of the first liquid crystal layer 103, successively. In other words, the second linear polaroid 104 is disposed in front of the first liquid crystal layer 103, and the second liquid crystal layer 105, also referred to as the shifting layer, is disposed in front of the second linear polaroid 104. The retarding layer 106 is disposed in front of the second liquid crystal layer 105. It should be noted that, in one embodiment, the second liquid crystal layer 105 and the retarding layer 106 may be disposed in the 3D image display device 10. In another embodiment, the second liquid crystal layer 105 and the retarding layer 106 may be disposed outside of the 3D image display device 10, i.e. may be disposed as an attachable device or an additional device for the display. In one embodiment, the angle of the absorption axis of the first linear polaroid 102 is 135 degree, and the angle of the transmission axis of the first linear polaroid 102 is 45 degree, which refers to that the first polarization angle is 45 degree.

Figure 2A:
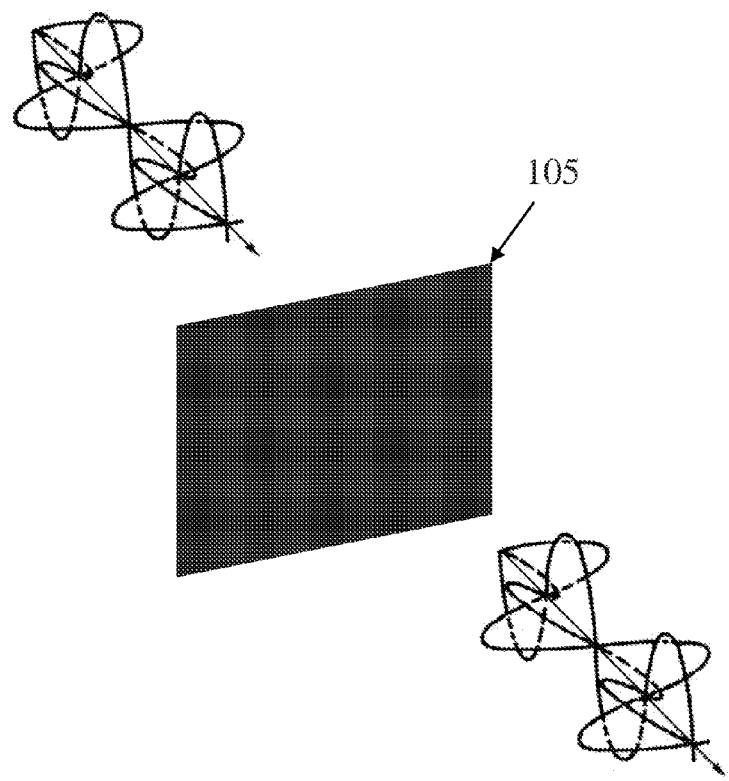
FIG. 2A illustrates a diagram showing that the image light passes through a second liquid crystal layer with a gray level of 0 in accordance with one embodiment of the present invention.
Figure 2B:
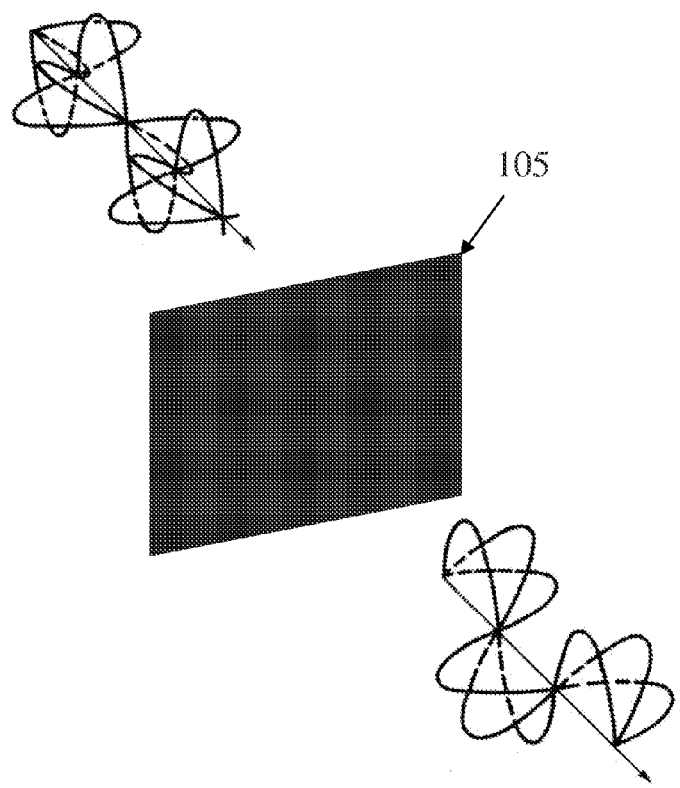
FIG. 2B illustrates a diagram showing that the image light passes through the second liquid crystal layer with a gray level of 255 in accordance with one embodiment of the present invention.

In one embodiment, the angle of the absorption axis of the second linear polaroid 104 is 45 degree and the angle of the transmission axis of the second linear polaroid 104 is 135 degree, which means that the second polarization angle is 135 degree. Therefore, the polarized light with the angle of 45 degree will be filtered out by the second linear polaroid 104, and the polarized light with the angle of 135 degree will pass through the second linear polaroid 104. The gray level status of the second liquid crystal layer 105 may be switched to control the linear polarization orientation of the image light passing through the second liquid crystal layer 105. In one embodiment, the gray levels of the second liquid crystal layer 105 may be switched to the minimum gray level, for example 0. As shown in FIG. 2A, when the gray levels of the second liquid crystal layer 105 are switched to 0, the polarization orientation of the image light passing through the second liquid crystal layer 105 will not be changed. If the polarization angle of the incident image light is 135 degree, the polarization angle of the light passing through the second liquid crystal layer 105 remains 135 degree. In another embodiment, the gray levels of the second liquid crystal layer 105 may be switched to the maximum gray level, for example 255. As shown in FIG. 2B, when the gray levels of the second liquid crystal layer 105 are switched to 255, the polarization orientation of the image light passing through the second liquid crystal layer 105 will be shifted 90 degree. If the polarization angle of the incident image light is 135 degree, the polarization angle of the light passing through the second liquid crystal layer 105 is shifted to 45 degree.

Figure 3A:
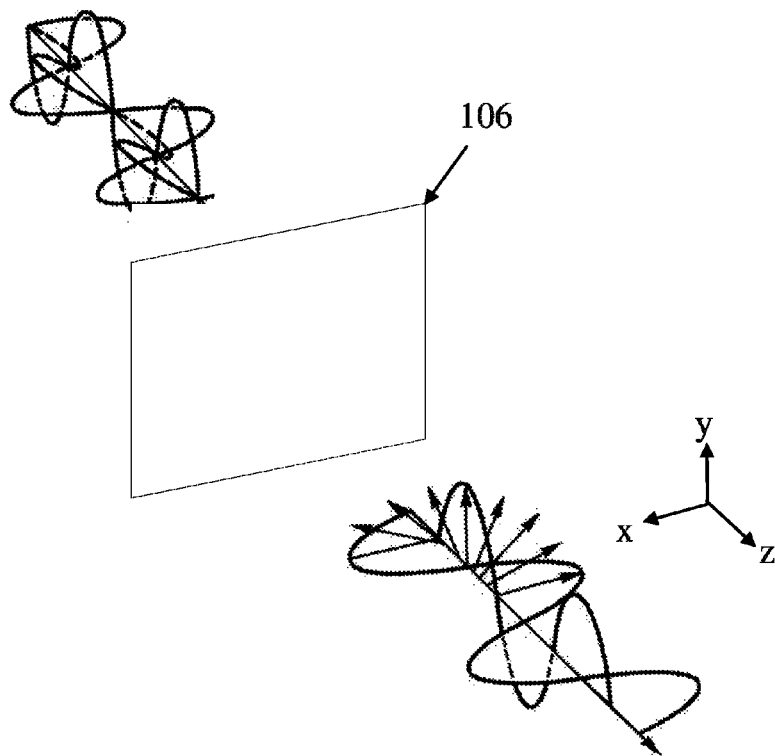
FIG. 3A illustrates a diagram showing that the polarized light with an angle of 135 degree passes through a retarding layer in accordance with one embodiment of the present invention.
Figure 3B:
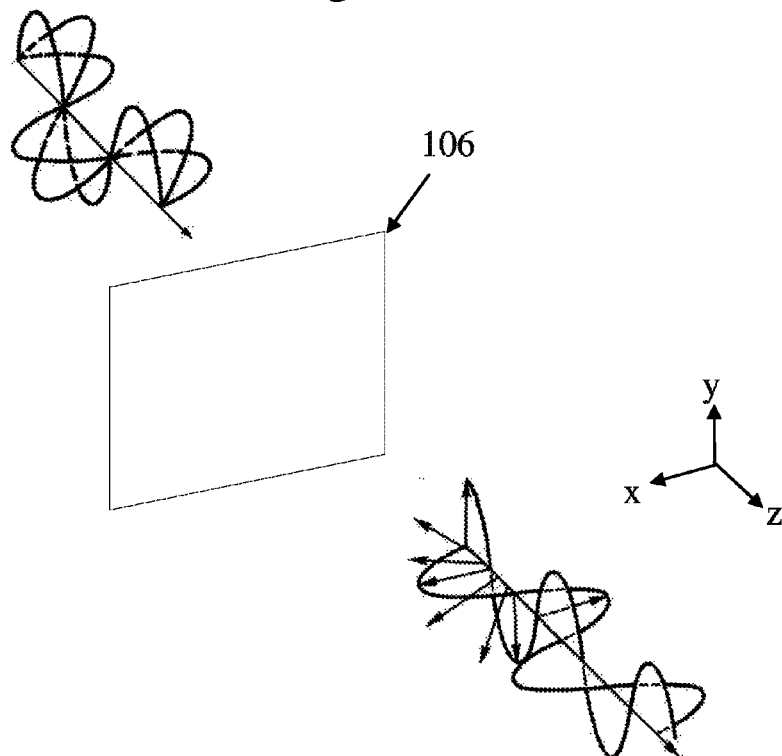
FIG. 3B illustrates a diagram showing that the polarized light with an angle of 45 degree passes through the retarding layer in accordance with one embodiment of the present invention.

The retarding layer 106 is able to cause phase retardation of quarter wavelength ($\lambda/4$). The image signals on the Y axis are retarded by a quarter wavelength by the retarding layer 106, and the image signals on the X axis are remained the same. Therefore, the retarding layer 106 transforms the linear polarization orientation of the image light into a circular polarization orientation, for example a right-circularly polarized light or a left-circularly polarized light. As shown in FIG. 3A, if the incident image light into the retarding layer 106 is the polarized light with the angle of 135 degree, the light passing through the retarding layer 106 is transformed into the left-circularly polarized light. As shown in FIG. 3B, if the incident image light into the retarding layer 106 is the polarized light with the angle of 45 degree, the light passing through the retarding layer 106 is transformed into the right-circularly polarized light. When a circularly polarized glasses, in which the left eyeglass is a left circular polarizer and the right eyeglass is a right circular polarizer, is utilized to observe the image light passing through the retarding layer 106, the left-circularly polarized image light and the right-circularly polarized image light emitted from the retarding layer 106 can be seen from the left eyeglass and the right eyeglass sequentially and respectively. Therefore, the circular polarization orientation of the image light emitted from the retarding layer 106 can be controlled to be left-circularly light or right-circularly light by switching the gray levels of the second liquid crystal layer 105, so as to control the image data to be seen from which eyeglass of the circularly polarized glasses.

Figure 4:
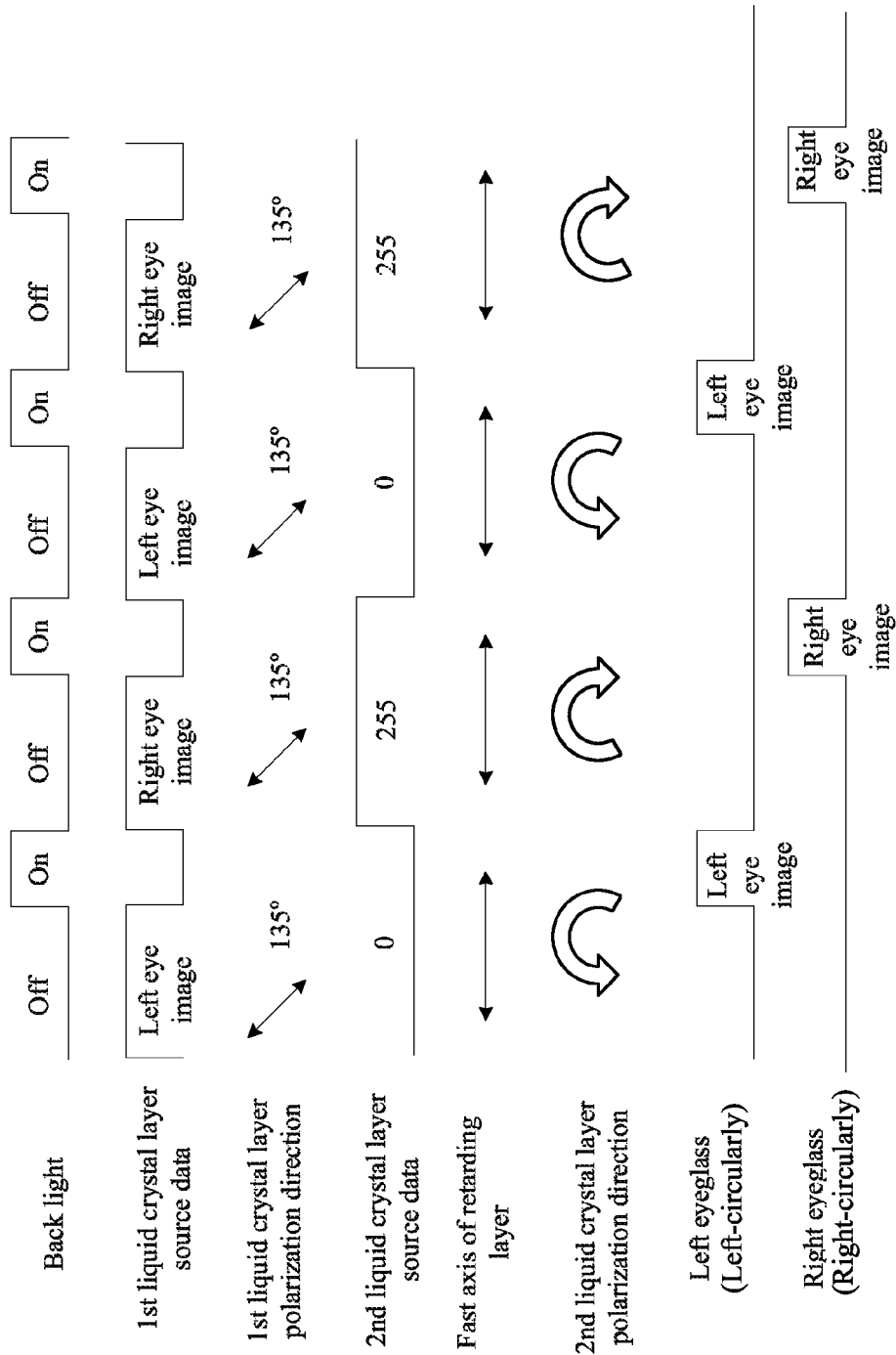
FIG. 4 illustrates a signal control sequence diagram in accordance with one embodiment of the present invention.

As shown in FIG. 4, the switching times of the gray levels of the second liquid crystal layer 105, the input times of the left eye image and the right eye image of the first liquid crystal layer 103, and the ON/OFF times of the back light may be adjusted to match with one another. As a result, when the gray levels of the second liquid crystal layer 105 are switched to 0, the left eye image is inputted into the first liquid crystal layer 103 and the back light is turned on after the input action completes, such that the left eyeglass of the circularly polarized glasses will receive the left-circularly polarized light of the left eye image. When the gray levels of the second liquid crystal layer 105 are switched to 255, the right eye image is inputted into the first liquid crystal layer 103 and the back light is turned on after the input action completes, such that the right eyeglass of the circularly polarized glasses will receive the right-circularly polarized light of the right eye image. Therefore, the left eye and the right eye of the user who wears the circularly polarized glasses can receive the left eye image and the right eye image at different times respectively to observe stereoscopic images.

Figure 5:
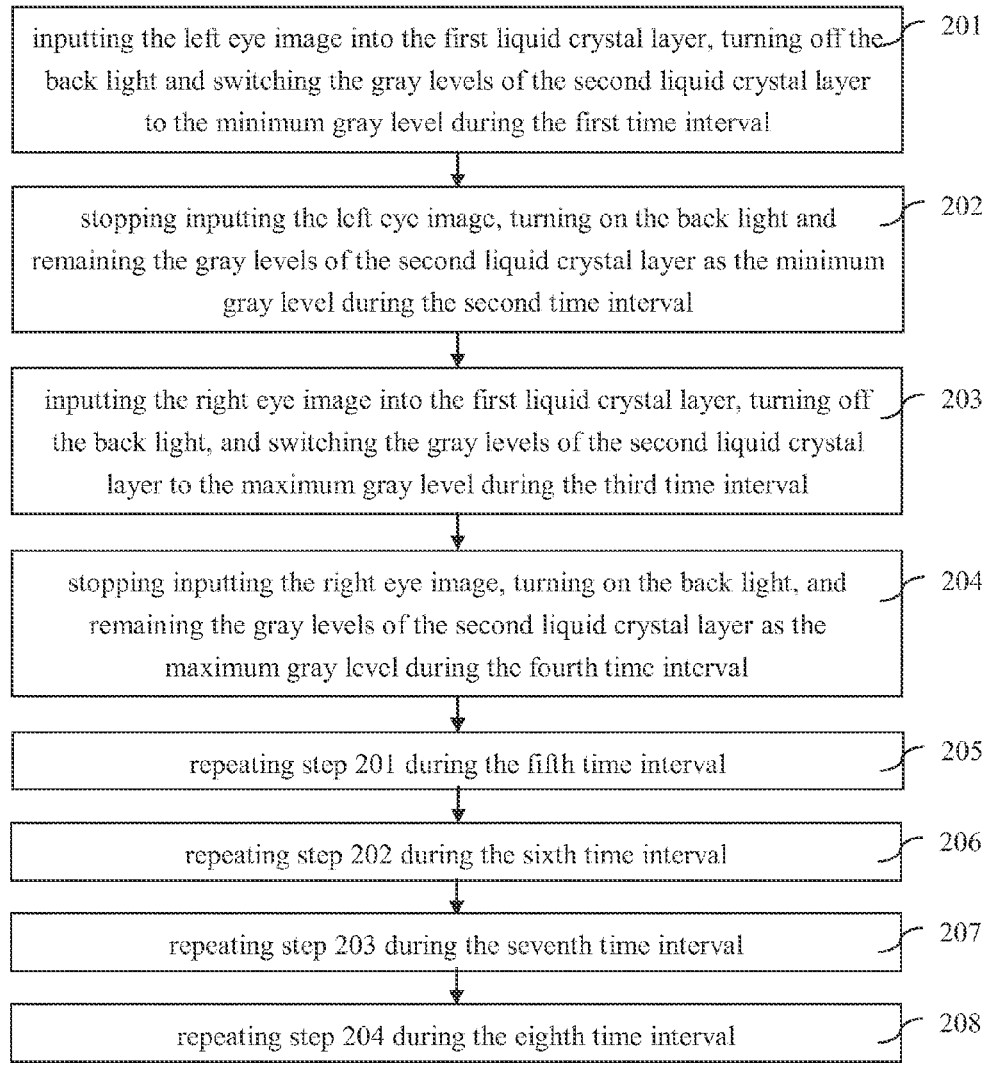
FIG. 5 illustrates a flow diagram of the 3D image signal controlling method in accordance with another embodiment of the present invention.

Accordingly, as shown in FIG. 5, in another embodiment, the present invention provides a 3D image signal controlling method. The 3D image signal controlling method 20 of the present invention includes inputting the left eye image into the first liquid crystal layer 103, turning off the back light and switching the gray levels of the second liquid crystal layer 105 to the minimum gray level during the first time interval in step 201. In one embodiment, the minimum gray level may be 0. Subsequently, the input of the left eye image is stopped, the back light is turned on and the gray levels of the second liquid crystal layer 105 are remained as the minimum gray level during the second time interval in step 202. Then, the right eye image is inputted into the first liquid crystal layer 103, the back light is turned off, and the gray levels of the second liquid crystal layer 105 are switched to the maximum gray level during the third time interval in step 203. In one embodiment, the maximum gray level may be 255. Subsequently, the input of the right eye image is stopped, the back light is turned on, and the gray levels of the second liquid crystal layer 105 are remained as the maximum gray level during the fourth time interval in step 204. Then, step 201 is repeated during the fifth time interval in step 205. Subsequently, step 202 is repeated during the sixth time interval in step 206 as well. Similarly, the step 203 is then repeated during the seventh time interval in step 207. Subsequently, step 204 is repeated during the eighth time interval in step 208. The steps 201-204 are instructed to successively repeat in the aforementioned sequences.

Therefore, as aforementioned, the 3D image display device and the 3D image signal controlling method provided by the present invention transform the single linear polarization orientation of the image light, for example to transform the polarized light with the angle of 135 degree into left or right circular polarization, through the second liquid crystal layer and the retarding layer. The present invention also provides the left eye image with left-circularly light or the right eye image with right-circularly light to the circularly polarized glasses at different times by controlling the ON/OFF times of the back light, the input times of the left eye image and the right eye image of the first liquid crystal layer and the switching times of the gray levels of the second liquid crystal layer, such that the user who wears the circularly polarized glasses can see the stereoscopic images.

Even if the user rotates the circularly polarized glasses or shifts the angle of the circularly polarized glasses unconsciously, the user's eyes will not receive all black images resulting from the failure of transmission of the polarized light because the present invention transforms the linear polarization into the circular polarization and cooperates with the circularly polarized glasses. That is to say, the user can see 3D stereoscopic images no matter the user wears the circularly polarized glasses on any angles. Furthermore, the present invention utilizes the 3D image signal controlling method to input the left eye image or the right eye image at different times, thereby the left eye image with the left-circularly light or the right eye image with the right-circularly light have complete resolution in the horizontal or vertical direction and the user will not suffer the problem of the insufficient vertical resolution. Moreover, the 3D glasses in cooperation with the 3D image display device of the present invention are the circularly polarized glasses of the passive type 3D glasses, thereby omitting the usage of the batteries and the emitter is practicable. The problem of the limited effective distance between the 3D glasses and the emitter is solved, and the shielding issue by other objects is removed, and the charging issue or the environment pollution problem is also eliminated.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A 3D image signal controlling method to control a 3D image display device, said method comprising:

preparing a 3D image display device, said 3D image display device comprising a backlight module, a first linear polaroid disposed in front of said backlight module, a first liquid crystal layer disposed in front of said first linear polaroid, a second linear polaroid disposed in front of said first liquid crystal layer, a second liquid crystal layer disposed in front of said second linear polaroid to change a linear polarization orientation of image signals, and a retarding layer disposed in front of said second liquid crystal layer to transform said linear polarization orientation into a circular polarization orientation, said first linear polaroid having a first polarization orientation, said second linear polaroid having a second polarization orientation;

inputting a left eye image into said first liquid crystal layer, turning off said backlight module and switching gray levels of said second liquid crystal layer to a minimum gray level during (4N-3)th time interval, wherein N is natural number;

stopping inputting said left eye image, turning on said backlight module and remaining said gray levels of said second liquid crystal layer as said minimum gray level during (4N-2)th time interval;

inputting a right eye image into said first liquid crystal layer, turning off said backlight module and switching said gray levels of said second liquid crystal layer to a maximum gray level during (4N-1)th time interval; and stopping inputting said right eye image, turning on said backlight module and remaining said gray levels of said second liquid crystal layer as said maximum gray level during (4N)th time interval.

2. The method of claim 1, wherein said minimum gray level comprises 0.

3. The method of claim 1, wherein said maximum gray level comprises 255.

* * * * *